F. S. MILLER, DEC'D.
W. LANGSENKAMP, JR., TRUSTEE.
AIR LIFT PUMP BOOSTER.
APPLICATION FILED MAY 1, 1916.
Reissued June 4, 1918.
14,479.
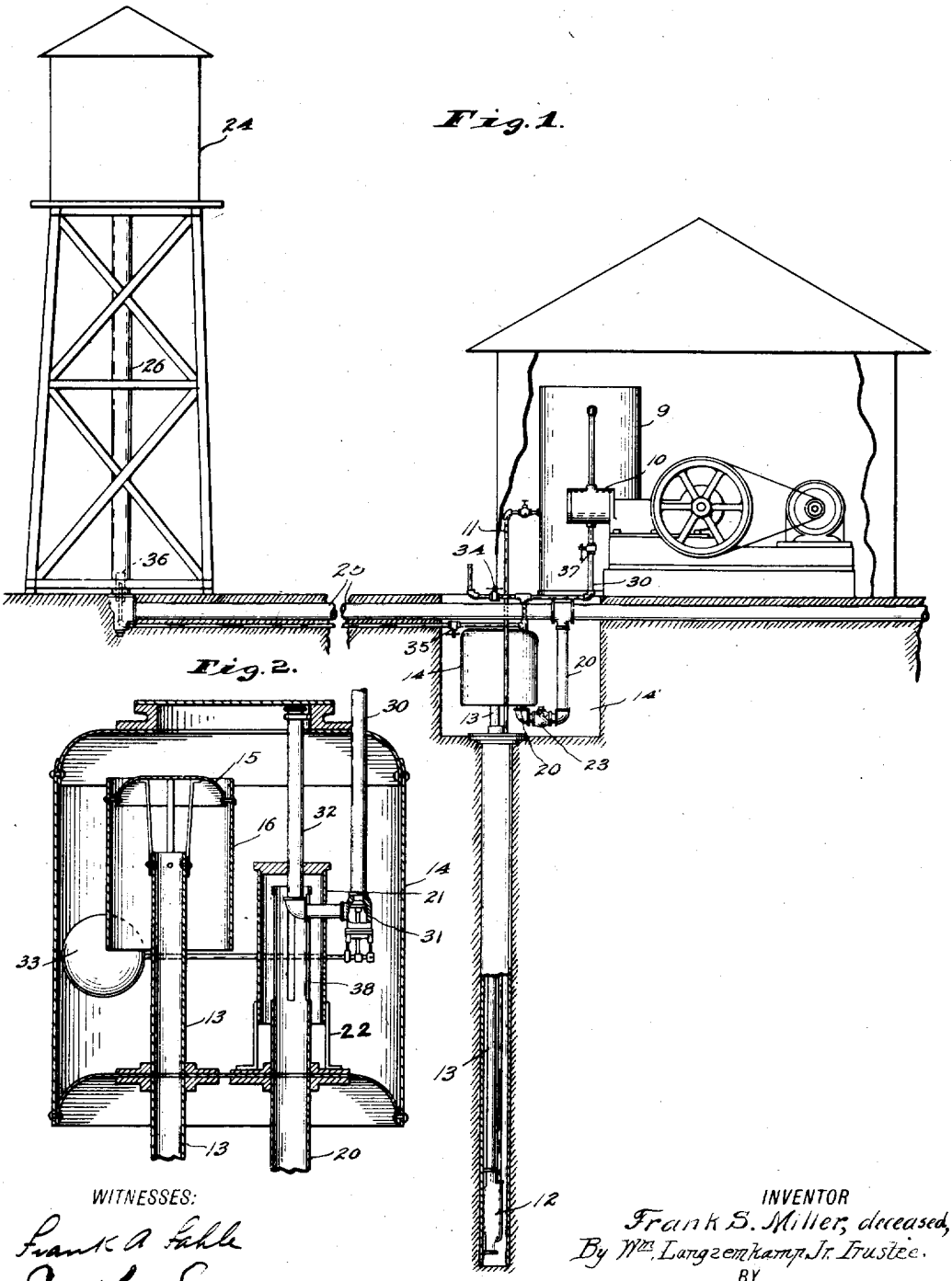
WITNESSES:
Frank A. Fahle
Josephine Gayser
INVENTOR
Frank S. Miller, deceased,
By Wm. Langsenkamp, Jr. Trustee.
BY
Hood & Colby.
ATTORNEY

UNITED STATES PATENT OFFICE.

FRANK S. MILLER, DECEASED, LATE OF INDIANAPOLIS, INDIANA, BY WILLIAM LANGSENKAMP, JR., TRUSTEE, OF INDIANAPOLIS, INDIANA, ASSIGNEE, BY MESNE ASSIGNMENTS.

AIR-LIFT-PUMP BOOSTER.

14,479. Specification of Reissued Letters Patent. Reissued June 4, 1918.

Original No. 1,157,998, dated October 26, 1915, Serial No. 815,594, filed January 31, 1914. Application for reissue filed May 1, 1916. Serial No. 94,833.

*To all whom it may concern:*

Be it known that FRANK S. MILLER, deceased, who before his death was a citizen of the United States, residing in Indianapolis, in the county of Marion and State of Indiana, invented a new and useful Air-Lift-Pump Booster, of which the following is a specification.

In the operation of air lift pumps, it has heretofore been necessary in most systems that the flow of water caused by the air be vertical or nearly so, as difficulty has always been experienced in case it was attempted to convey the mixed air and water horizontally. It has also been necessary, in order to obtain practical efficiency, that the air nozzle be submerged below the water level a distance bearing a large ratio to the total lift of the water.

It is the object of his present invention to provide a booster, whereby water may be conveyed horizontally through pipes from an air lift pump, and whereby the ratio of the submergence of the air nozzle below the water level to the total height through which the water is to be lifted may be lessened without diminishing the efficiency of the pump. In accomplishing this object, he provided a chamber which may be lower than the final level to which water is to be lifted, and placed this chamber so that the pipe extending upward from the air lift pump in the well discharges into it, preferably vertically, the chamber providing a space within which the mixed air and water from the well are sufficiently quiet to separate, and this separation being made more complete by causing the discharge into the chamber to be against the under side of an umbrella located in such chamber above the water level therein. This chamber is a closed chamber, and the pressure of the air which is thus separated from the water is used to force the water thus separated out of this chamber and if desired along a horizontal pipe and to a higher water level. The amount of air within the chamber is controlled by the water level in such chamber to maintain such level substantially constant, there being an automatic valve which as the water falls is opened to allow the air to escape from such chamber, this air conveniently either passing to the atmosphere, to the intake side of the compressor which supplies the air for the air nozzle of the pump, or to another air nozzle.

The accompanying drawings illustrate his invention. Figure 1 is a diagrammatic view showing a system embodying his invention; and Fig. 2 is a vertical sectional view through the booster.

The air compressor 10 supplies compressed air through a reservoir 9 and a pipe 11 to the air nozzle which is at a sufficient distance down in the well, and this air nozzle, which for the sake of the injector action he preferred to make in the form shown in his Patent No. 1,036,524, issued August 20, 1912, discharges air which mixes with the water in the well to produce an emulsion which rises in the pipe 13. This pipe 13 leads substantially straight upward into a booster shell or chamber 14, which is air and water tight and is conveniently located in a pit 14′ just below the surface of the ground. The pipe 13 extends only part way up into the booster shell 14, but above the water level therein, and is conveniently surmounted by an umbrella 15, the umbrella and the upper end of the pipe 13 conveniently being surrounded by a cylinder 16 open at both the upper and lower ends. The umbrella and the shell 16 direct the water discharged from the pipe 13 toward the bottom of the shell 14, and allow this water to be separated from the air with which it is mixed. A second pipe 20 projects up through the bottom of the shell 14, and its upper end is surrounded by a hood or cylinder 21 spaced from the pipe 20 and closed at its upper end. The cylinder 21 is open at its lower end, being supported above the floor of the shell 14 by legs 22, or in some other convenient manner. The pipe 20 communicates with the space in the shell 14 by this open lower end of the cylinder 21, such end being below the water level in the shell 14. The pipe 20 may be connected, preferably through a check valve 23 which prevents back flow, with a suitable storage reservoir 24, shown as a tank supported on a suitable framework above the level of the ground, the connection between the pipe 20 and the tank 24 including, if necessary, a horizontal pipe 25 which extends a considerable distance and a vertical pipe 26 which leads from the pipe 25 to the reservoir 24. Horizontal pipes 25 up to nearly a mile in length have been used, and vertical pipes up to sixty or seventy feet high. A third pipe 30 also extends into the shell 14, communicating through a valve 31 with a pipe 32 which opens near the top of and within the booster shell 14. The valve 31 is operated by a float 33, controlled by the level of the water within the booster shell to open the valve 31 as such water level falls and to close it as such water level rises. The pipe 30 may discharge to the atmosphere, as through the valve 34, or may be connected to a nozzle for an air lift pump, either in the same or a different system, as through a valve 35 to a nozzle 36 at the base of the pipe 26, or may lead to the intake side of the compressor 10, as shown, as through the valve 37, thus increasing the efficiency of such compressor. All three, or any one or two, of these discharge outlets for the air in the booster shell 14 may be used.

In operation, the compressed air discharged by the nozzle 12 mixes with the water in the well to form an emulsion which overflows the top of the pipe 13 into the shell or chamber 14. When so discharged, this emulsion separates within the booster shell 14 into its constituents air and water, the water falling to the bottom and the air rising to the top of the shell 14. The separation is made more effective and complete by reason of the upward discharge of this overflowing air and water against the under side of the umbrella 15, which deflects the water downward and against the open ended cylinder 16 and provides an excellent opportunity for the air to escape from the water. The pressure of this separated air on the upper surface of the water causes the latter to flow up through the bottom of the cylinder 21 and into the pipe 20, the entrance to the pipe 20 being either at the top thereof or through slots 38 with which said pipe is preferably provided within the cylinder 21. The pressure of the air on the water is sufficiently great to force this water through the pipe 20 and the check valve 23 and through the horizontal pipe 25 and vertical pipe 26 into the tank 24. The pressure of the air within the booster shell 14 is automatically maintained sufficiently high to accomplish this, because the level of the water within the shell 14 is controlled by the opposing action of the pressure of the air within such shell and the back pressure of the head of water from the tank 24, such water level in the booster shell falling as the air pressure predominates. When the water level in the booster shell 14 falls, the consequent falling of the float 33 opens the valve 31 to allow air to escape through the pipes 32 and 30, thus diminishing the air pressure within the shell 14 and allowing the water level in the booster shell to rise as the water overflows from the pipe 13. If the air pressure falls too greatly, the back pressure from the water predominates, and the flow of water through the pipe 20 ceases until the water level within the booster shell 14 rises sufficiently to cause the float 33 to close the valve 31 to permit the air pressure within the booster shell 14 to rise so that it predominates over the back pressure from the water head.

By the arrangement described, the water may be forced horizontally for great distances, in a manner impossible hitherto with air lift pumps, and the ratio of the submergence of the air nozzle 12 below the water level in the well to the total lift of the water is diminished because it is only necessary that this ratio be maintained between the submergence and the lift of the water into the booster shell. Moreover, the water discharged into the pipe 25, and also into the reservoir 24 if the air nozzle 36 is not used, is substantially free from air.

I claim as his invention:

1. In combination, a closed chamber, a pipe leading from a well into such chamber and opening into said chamber above the liquid level therein, an air nozzle in such pipe below such chamber, a pipe leading from such chamber and opening into such chamber below the liquid level therein, a downwardly opening hood located in said chamber and having its open lower end below the liquid level therein, said first named pipe discharging upwardly into said chamber and said last named pipe opening under said hood, and an automatic air valve controlling the outlet of air from and maintaining a pressure greater than atmosphere in said chamber.

2. In combination, a closed chamber, a pipe leading from a well and discharging upwardly substantially vertically into such chamber, an air nozzle in such pipe below such chamber, a pipe leading from such chamber, a hood in such chamber over the end of said last named pipe, said hood having its lower end open below the liquid level in said chamber and having its upper end closed, a container which is connected to said last named pipe to receive the discharge therefrom, and an automatic air valve controlling the outlet of air from and maintaining a pressure greater than atmosphere in said chamber.

3. In combination, a closed chamber, a pipe leading from a well into such chamber, an air nozzle in such pipe below such chamber, a pipe leading from such chamber, a hood in said chamber over the end of said last named pipe, said hood having its lower end open below the liquid level in said chamber and having its upper end closed, and an automatic air valve controlling the outlet of air from and maintaining a pressure greater than atmosphere in said chamber.

4. In combination, a closed chamber, a pipe leading from a well into said chamber, an air nozzle in such pipe below such chamber, a pipe leading from such chamber and opening into such chamber below the liquid level therein, a container which is connected to said last named pipe, said container being higher than said chamber, an automatic air valve controlling the outlet of air from such chamber, an air compressor for supplying air to said air nozzle, and an air nozzle in the connection between said chamber and said container, said air valve discharging both to the said last named nozzle and to the inlet side of said compressor.

5. In combination, a closed chamber, a pipe leading from a well into such chamber and opening into said chamber above the liquid level therein, an air nozzle in such pipe below such chamber, a pipe leading from such chamber and opening into such chamber below the liquid level therein, a downwardly opening hood located in said chamber and having its open lower end below the liquid level therein, said first named pipe discharging upwardly into said chamber and said last named pipe opening under said hood, said chamber having an air outlet opening therefrom which air outlet opening communicates with the chamber at a point higher than the liquid level therein, and a valve controlling said air outlet opening to permit the escape of air from said chamber but to maintain a pressure greater than atmosphere in said chamber.

6. In combination, a closed chamber, a pipe leading from a well and discharging upwardly substantially vertically into such chamber, an air nozzle in such pipe below such chamber, a pipe leading from such chamber, a hood in such chamber over the end of said last named pipe, said hood having its lower end below the liquid level in said chamber and having its upper end closed, a container which is connected to said last named pipe to receive the discharge therefrom, said chamber having an air outlet opening therefrom which air outlet opening communicates with the chamber at a point higher than the liquid level therein, and a valve controlling said air outlet opening to permit the escape of air from said chamber but to maintain a pressure greater than atmosphere in said chamber.

7. In combination, a closed chamber, a pipe leading from a well into such chamber, an air nozzle in such pipe below such chamber, a pipe leading from such chamber, a hood in said chamber over the end of said last named pipe, said hood having its lower end open below the liquid level in said chamber and having its upper end closed, said chamber having an air outlet opening therefrom which air outlet opening communicates with the chamber at a point higher than the liquid level therein, and a valve controlling said air outlet opening to permit the escape of air from said chamber but to maintain a pressure greater than atmosphere in said chamber.

8. In combination, a closed chamber, a pipe leading from a well into such chamber, an air nozzle in such pipe below such chamber, a pipe leading from such chamber and opening into such chamber below the liquid level therein, a container which is connected to said last named pipe, said container being higher than said chamber, said chamber having an air outlet opening therefrom which air outlet opening communicates with the chamber at a point higher than the liquid level therein, a valve controlling said air outlet opening to permit the escape of air from said chamber but to maintain a pressure greater than atmosphere in said chamber, an air compressor for supplying air to said air nozzle, and an air nozzle in the connection between said chamber and said container, said air valve discharging both to the said last named nozzle and to the inlet side of said compressor.

9. In combination, a closed chamber, a pipe leading from a well into such chamber, an air nozzle in such pipe below such chamber, a pipe leading from such chamber and opening into the main space within the chamber below the liquid level therein and by a passageway which carries the liquid from the chamber first upward and then downward, said chamber having an air outlet opening therefrom which air outlet opening communicates with the chamber at a point higher than the liquid level therein, and a valve controlling said air outlet opening to permit the escape of air from said chamber but to maintain a pressure greater than atmosphere in said chamber.

10. In combination, a closed chamber, a pipe leading from a well into such chamber, an air nozzle in such pipe below such chamber, a pipe leading from such chamber and opening into the main space within the chamber below the liquid level therein and by a passageway which carries the liquid from the first chamber first upward and then downward, said chamber having a restricted air outlet opening therefrom which air outlet opening communicates with the chamber at a point higher than the liquid level therein so as to permit a restricted escape of air while maintaining the pressure of the retained air above atmospheric pressure.

In witness whereof, I have hereunto set my hand this 28th day of April, 1916.

WILLIAM LANGSENKAMP, JR.,
*Trustee of Frank S. Miller, deceased.*

Witnesses:
FRANK A. FAHLE,
GEO. B. SCHLEY.